UNITED STATES PATENT OFFICE.

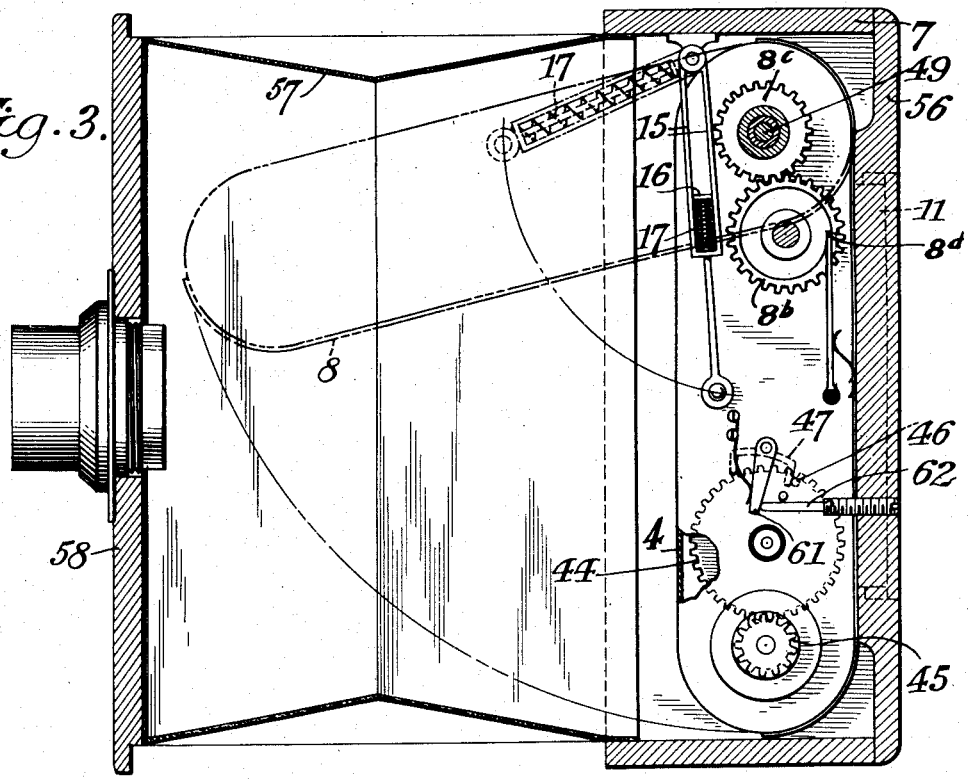
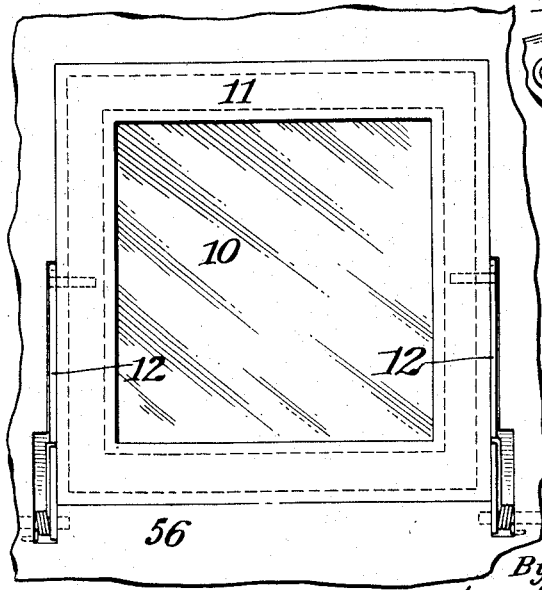
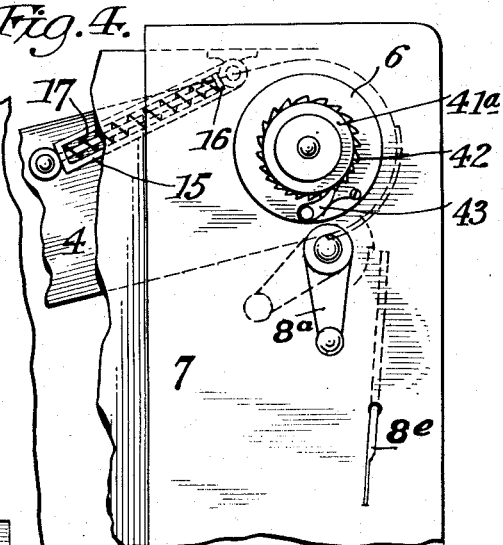

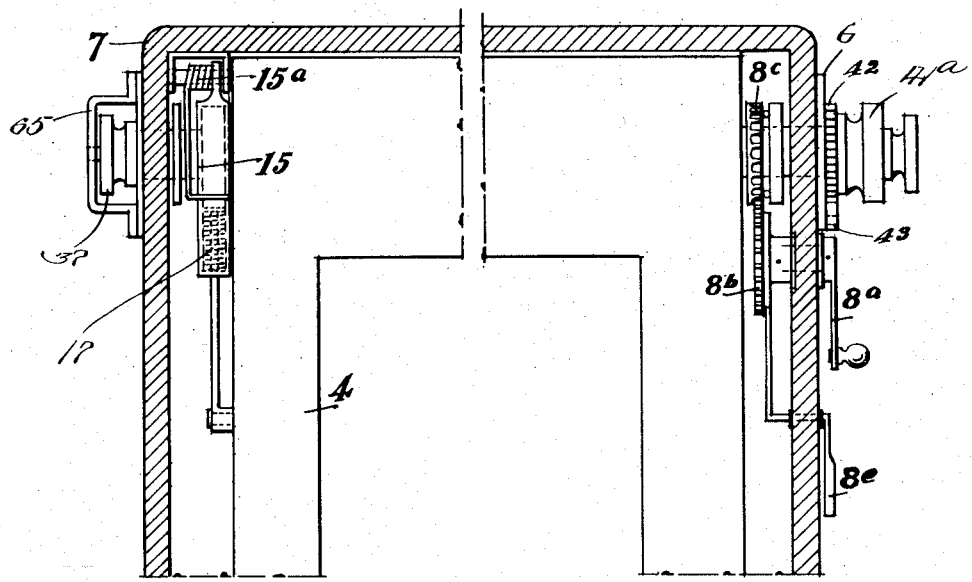

GRAHAM KING, OF SOUTH ORANGE, NEW JERSEY.

CAMERA.

1,379,189.   Specification of Letters Patent.   Patented May 24, 1921.

Application filed April 22, 1918. Serial No. 229,969.

*To all whom it may concern:*

Be it known that I, GRAHAM KING, a citizen of the United States, residing at South Orange, in the county of Essex and State of New Jersey, have invented certain new and useful Improvements in Cameras, of which the following is a full, clear, and exact description.

The invention which constitutes the subject matter of this application relates to a camera constructed with a view to simplicity, compactness, ease of operation under all conditions, and to prevent the exposure of the film when setting the shutter. With these objects in view the improved device is provided with a pivotally mounted holder, containing a focal plane or curtain shutter and the necessary centers or spindles for holding and operating the roll film, so supported within the camera that the holder may be swung upward and held in position out of the line of light entering through the lens, permitting the image formed by the lens to be thrown upon the usual ground glass. This enables the image to be viewed from the back of the camera and properly focused. When desired the film is exposed by releasing the holder which swings down into position, bringing the film into the focal plane and at the proper time automatically operating the shutter.

Other objects and advantages of my invention will appear from the detailed description below taken in connection with the accompanying drawing, in which,—

Fig. 3 is a vertical longitudinal section showing a side view of the holder 4.

Fig. 4 is a detail of parts shown.

Fig. 5 is a detail of the ground glass, frame and spring operated arms.

Fig. 6 is a detail of the spring actuating the arms 15.

Fig. 7 is a detail of parts shown.

Figure 2:
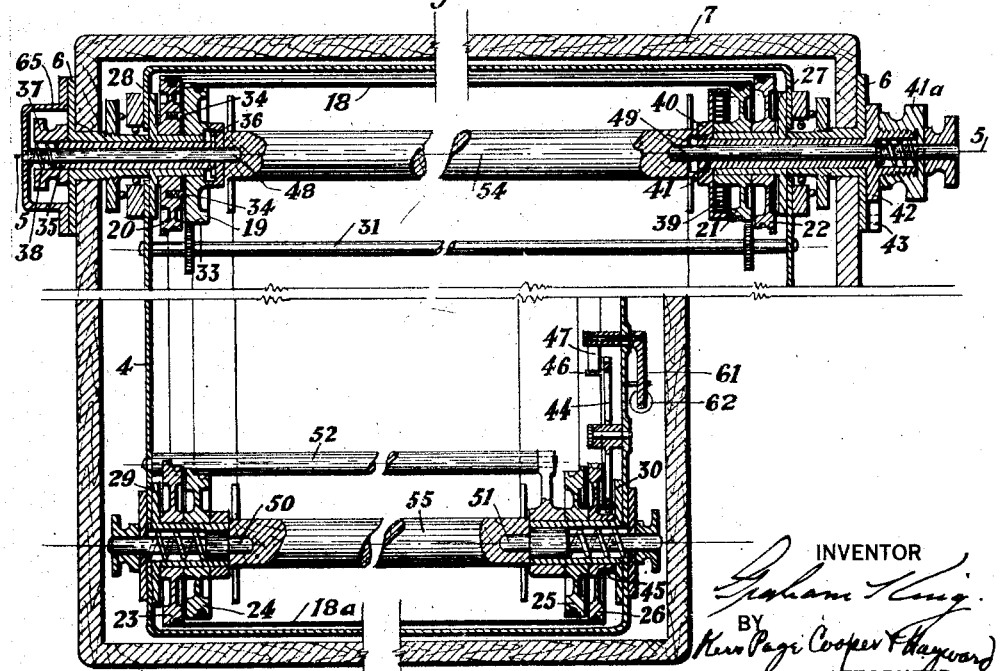
Fig. 2 is a vertical section taken through the axes of the shutter and film rolls on the line 2—2, Fig. 1.

Referring to the drawings in detail, the reference numeral 4 designates the pivotally mounted holder which has its back removable to enable the film to be inserted, and its front open to permit the light from the lens to reach the film. The holder oscillates about the axis 5—5, (see Fig. 2) working on ball bearings carried by the hollow studs 6—6, which are rigidly secured to the camera frame 7.

Figure 1:
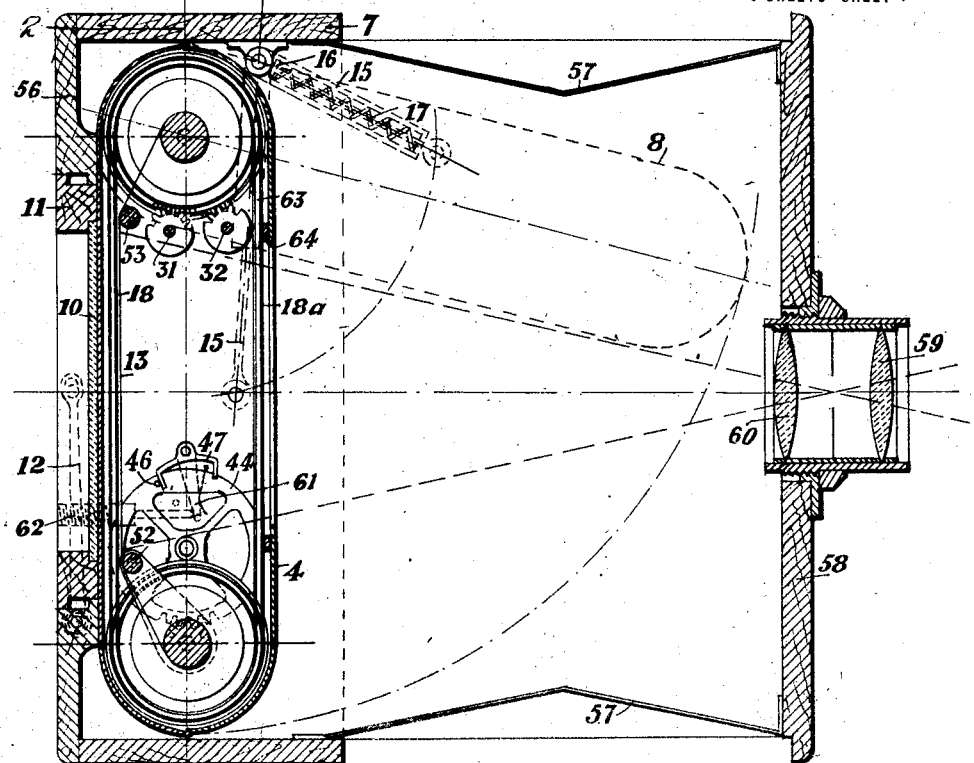
Figure 1 is a vertical longitudinal section passing through the axis of the lens, illustrating the normal position of the various parts.

In Fig. 1 the holder is shown in its position at the time of making an exposure. To enable the image to be viewed on the ground glass the holder is revolved into the dotted position 8, by means of a lever $8^a$ and gears $8^b$ and $8^c$ (Figs. 3 and 7), operated from the exterior of the camera, and held in this position by means of a suitable catch $8^d$ (see Fig. 3).

The ground glass 10 (see Fig. 1) is carried in a frame 11, which is supported in the back of the camera by the spring actuated arms 12. The film 13, in its normal position as illustrated in Fig. 1, is located in the focal plane. When the holder is revolved to the position 8, Figs. 1 and 3, the ground glass is automatically pressed forward into the focal plane by the arms 12 and there maintained by projections on the interior of the back 56 which will not permit of its further forward movement.

To make the exposure the holder is released by a trigger $8^e$ (Figs. 3, 4 and 7) operated from the exterior of the camera and is returned to the position shown in Fig. 1 by spring $15^a$, or by gravity. The shutter is operated by the holder engaging escapement mechanism when the said holder has about reached its final position and at the moment when the film is in the focal plane. The momentum of the holder is checked, as it revolves, by pistons 16 on the arms 15 (only one being illustrated), and also by the spring actuated ground glass frame 11. The pistons 16 work against the coil springs 17 with increasing pressure as the holder, together with arms 15, move to normal position. The tension of the springs $15^a$ (see Fig. 6) is sufficient to maintain the ground glass 10 and its frame 11 in their rearmost position.

The shutter is of the focal plane or curtain type made in two parts or leaves 18 and $18^a$ (see Fig. 1). These leaves or curtains are in the form of endless bands continuous at their edges, but in the center a portion is cut away to provide apertures or slits which overlap to form the opening through which the film is exposed as the curtains pass over the same. The two endless bands or shutter leaves are arranged one inside the other and entirely surround the film spools and the film carried thereby. The leaves of the shutter run over small sheaves 19, 20, 21, 22, 23, 24, 25 and 26 (see Fig. 2), which revolve on hollow studs 27, 28, 29 and 30, rigidly fastened to the holder 4. The sheaves 19, 20, 21, 22 have on their face at the outer edge gear teeth, and sheave 19 is geared to 21 and 20 to 22 through the shafts and gears 31 and 32 respectively to insure that a simultaneous and corresponding movement is imparted thereto. To prevent slipping of the curtain leaves, the faces of the sheaves are preferably provided with depressions 33 (Fig. 2) uniformly spaced, which receive corresponding protuberances placed along the edges of the shutter leaves on the inside next to the sheaves.

All the sheaves run idle on the hollow studs, and in order that they may all rotate simultaneously when the shutter is operated, sheaves 19 and 20 are connected by means of a friction catch 34, the one shown consisting of a ball or balls a little less than half of which are held in spherical depressions in 19 by means of a coil spring located in a drill hole in 20. The ball also entering the drill hole acts as an impositive lock or key between the two sheaves.

The two leaves of the shutter when placed upon the sheaves will have their solid portions overlapping at the back of the holder (the side next the ground glass) and the edges of the solid portions will approach each other at the front (the side next the lens) but will not meet or overlap, thus forming a slit or opening which will extend from side to side of the leaves. Now if the sheaves are rotated this slit or opening can be made to travel from top to bottom of the holder and if the lens is uncapped and the film in position the film will be exposed to the lens light a length of time varying in proportion to the size of the opening and its speed of travel.

The size of the opening between the leaves is varied by rotating the sheave 19 by means of the hollow shaft 35 which has at its end a pin or key 36 which is drawn into a slot or keyway in the hub of the sheave. The shaft is rotated by the knob 37 and the pin or key is disengaged and normally held out of the slot or keyway by the spring 38. By rotating this sheave the leaves 18 and 18ª of the shutter are moved relatively to each other, thus enlarging or diminishing the size of the opening. The size of the opening desired is maintained by the friction catches 34.

The shutter is rotated and its speed controlled by means of a spiral spring 39 (see Fig. 2), contained in and one end of which is attached to a case or support 40, and the other end of which is attached to the hub of sheave 21. The spring is wound by rotating the support or case 40 by means of the shaft or spindle 41 to which the support is attached. A manipulating handle 41ª is removably secured to the shaft 41. The tension in the spring is held by means of a ratchet 42 and pawl 43, and the speed at which the shutter will move will be controlled by the amount of tension put on the spring by winding.

As the shutter will revolve in the same direction always, it must make a complete revolution for each exposure. This is controlled by the gear 44 which meshes with a gear 45 on the hub of sheave 26. The gear 44 is so proportioned with respect to gear 45 that one revolution allows the shutter to move the proper distance to make the exposure and return to its initial or normal position. The stopping and starting of the shutter is accomplished by means of a pin 46 on the side of the gear 44, a suitable escapement engaging the pin, and a tripping means for the escapement, as will more fully appear hereinafter.

From the above it will be obvious that the pawl 43 must be disengaged before the opening in the shutter is adjusted and returned into place when the tension is wound. Also that while the adjustment is being made the leaf 18ª of the shutter is held stationary by the pin 46 and escapement 47 through the gears 44 and 45, the sheaves 23, 26, 20 and 22 and the shutter leaf itself.

Other parts appearing on the drawing are the film rolls or spools 54 and 55; rollers 52 and 53 to keep the film normally in the focal plane; and the centers 48, 49, 50 and 51 carrying film spools, the centers 49, 50 and 51 adapted to be drawn outward for ease in inserting the film spool. The film is wound between exposures by the centers 49 which has a key engaging a slot in the film roll 54. A lens is indicated at 59—60.

The operation of the device, starting with the normal position of the holder as illustrated in Fig. 1, is as follows: The holder is pivotally mounted in a suitable casing or housing 7, provided with removable back 56. To the casing 7 is attached one end of a collapsible bellows or membrane 57 the other end of which is attached to a closure 58, which carrier the lenses 59 and 60. When the closure is drawn out, thereby extending the bellows 57, sufficient space will be provided to enable the holder to be moved therein to its dotted line position, all of which is clearly illustrated in Fig. 1. Assuming that the film spool has been inserted and properly adjusted the holder, when it is desired to take a picture, is raised to the dotted line position 8, as previously explained. Simultaneously with the upward movement of the holder the spring pressed arms 12 impart a forward movement to the ground glass 10 and its frame 11, bringing the said glass into the focal plane. The image of the object to be photographed is now thrown upon the screen, that is on the glass 10, and when properly positioned the trigger 8° is actuated to enable the holder to drop to normal position, and in doing this the downwardly projecting arm 61 of the escapement 47 comes into contact with a rigid member 62 which trips the gear 44 at the moment when the film 13 is in the focal plane. It will of course be understood that as the film approaches the focal plane the ground glass 10, with its frame 11, will be forced backwardly by the holder into its normal position illustrated in Fig. 1. Just before the gear 44 is tripped the perforation 63 in the shutter is located just above the opening 64 in the holder 4 suitable packing being interposed between the shutter and holder or casing to exclude all light. The tripping of the gear 44, however, enables the spring 39 to revolve the shutter, the first portion of the revolution thereof, causing the opening 63 to travel by the opening 64 in the holder for the purpose of exposing the film. It will, of course, be understood that the construction is such that a rotation of the gear 44 through an angle of 360° will effect a complete revolution of any point upon the shutter. It may be stated that Fig. 1 illustrates position of the parts just as they are after the holder has dropped, and the shutter operated to expose the film. And it may be stated at this point that at the initial upward movement of the holder a spring or other equivalent device causes the downwardly projecting arm 61 of the escapement to assume a vertical position, thereby causing the pin to engage the other side of the escapement ready to be tripped when the holder moves downwardly after being released, as will be understood.

When it is desired to insert a film, the rear cover 56, which is secured to the casing 7 by any suitable means, is removed. Likewise the back of the holder is removed. The shutter leaves are now adjusted so as to provide an opening in the rear of the holder, thereby enabling accessibility to be had to the film spools. It will, of course, be understood that when the rear cover 56 is removed the holder can be swung outwardly through a substantial angle.

The part 65 is merely a strap which provides access to the manipulating handle 37.

From the above description it will be obvious that the specific mechanism employed may be substantially altered or modified. Therefore it is to be understood that I do not limit myself to the exact construction illustrated and described as it is obvious that many changes may be made in minor particulars and other embodiments resorted to without deviating from the true spirit and scope of my invention.

What I claim is:—

1. A camera comprising a casing in combination with an inwardly swinging holder carrying the film and shutter.

2. A camera comprising a casing in combination with a film holder adapted to oscillate inside of said casing, and a shutter rotatably mounted upon said holder.

3. A camera comprising a casing in combination with a swinging holder in said casing, rotatable film spools carried by said holder, a shutter mounted upon said holder and rotating upon axes which are coaxial with the film spools.

4. A camera comprising a casing, in combination with a swinging holder in said casing, rotatable film spools carried by said holder, a shutter mounted upon said holder and rotatable always in the same direction upon axes which are coaxial with the film spools.

5. In a camera, a casing in combination with a swinging holder comprising a shutter mounted upon sheaves rotatable always in the same direction, and film spools carried by said holder, the sheaves and the spools for the film being arranged coaxially with each other.

6. In a camera, a casing, a non-swinging glass mounted in said casing to receive the image thereon, and a lens, in combination with a holder provided with a shutter and adapted to support the film, said holder adapted to be swung inside said casing to enable the image to be focused upon the glass, and adapted to be released to bring the film within the focal plane, and means for moving the shutter to expose the film when the latter is moved into the focal plane.

7. A structure as specified in claim 6 in which the glass for receiving the image is moved into the focal plane when the holder is moved inwardly but adapted to be moved back to normal position when the holder is released so as to enable the film to be brought into the focal plane.

8. A structure as specified in claim 5 in which the shutter is composed of two leaves adjustable with respect to each other to increase or diminish the size of the shutter opening.

9. In a camera, a casing in combination with a swinging holder comprising a shutter mounted upon sheaves and consisting of two leaves continuous at their edges and overlapping at their back but provided with exposure openings at the front, said leaves being adjustable with respect to each other to increase or diminish the size of the opening through which the exposure is made.

10. In a camera, a casing, a holder which carries the shutter and film and adapted to swing inwardly to enable the image of an object to be projected upon non-swinging surface normally back of said holder, said holder adapted to be released to bring the film within the focal plane, and means for automatically operating the shutter when the film is brought into the focal plane.

11. In a camera, in combination, a casing comprising a frame, a movable front, and a light-tight bellows connecting the frame and the front; a holder pivoted in the frame at one end thereof to swing forwardly into the bellows when the latter is extended, said holder being adapted to support a sensitive film in the focal plane for exposure; spaced film spools carried by the holder; and a focal plane shutter carried by the holder and encircling both said spools.

12. In a camera, in combination, a pair of spaced film spools; a focal plane shutter comprising a pair of endless bands arranged one inside the other and having apertures adapted to overlap to provide an exposure opening; and rotatable supports for said bands, co-axial with the film spools.

13. In a camera, in combination, a pair of spaced film spools; a focal plane shutter comprising a pair of endless bands arranged one inside the other and both inclosing both film spools, the bands having apertures adapted to overlap to provide an exposure opening; and rotatable supports for the bands.

14. In a camera, in combination, a casing; a film-holder comprising a flat box wholly inside the casing, having an opening in its front for the passage of light; a pivotal support for the holder, permitting the latter to swing forwardly in the casing; and movable means carried by the holder to close the opening therein to the passage of light.

In testimony whereof I hereunto affix my signature.

GRAHAM KING.